United States Patent [19]

Zabrocki et al.

[11] 4,022,726

[45] May 10, 1977

[54] STOVING LACQUER SYSTEMS HAVING A HIGH SOLIDS CONTENT AND COMPRISING AN ε-CAPROLACTONE

[75] Inventors: Karl Zabrocki, Buettgen; Rolf Dhein, Krefeld; Rolf Küchenmeister, Krefeld; Wolfgang Beer, Krefeld, all of Germany

[73] Assignee: Bayer Aktiengesellschaft, Germany

[22] Filed: July 8, 1975

[21] Appl. No.: 594,108

[30] Foreign Application Priority Data

July 12, 1974 Germany .................... 2433489

[52] U.S. Cl. .................... 260/21; 260/22 CQ; 260/33.4 R; 260/33.6 R; 260/850
[51] Int. Cl.$^2$ .................... C09D 3/52; C09D 3/66
[58] Field of Search .................... 260/21, 22 CQ, 850

[56] References Cited

UNITED STATES PATENTS

| 3,481,891 | 12/1969 | Boylan et al. ............... 260/21 |
| 3,748,293 | 7/1973 | Torelli ............................ 260/21 |
| 3,883,454 | 5/1975 | Dhein ............................ 260/21 |
| 3,892,714 | 7/1975 | Sampson et al. ........... 260/77.5 CR |
| 3,920,595 | 11/1975 | Anderson et al. ............ 260/21 |
| 3,928,265 | 12/1975 | Dhein et al. .................. 260/21 |

FOREIGN PATENTS OR APPLICATIONS

| 2,253,300 | 5/1974 | Germany ...................... 260/21 |

OTHER PUBLICATIONS

Chemical Abstracts, vol. 79, No. 12, Sept. 24, 1973, pp. 67915b, 67932e and 67933f.
Chemical Abstracts, vol. 81, No. 20, Nov. 18, 1974, p. 122953f.

*Primary Examiner*—Ronald W. Griffin
*Attorney, Agent, or Firm*—Connolly and Hutz

[57] ABSTRACT

Stoving lacquer systems having a high solids content contain a binder consisting of carboxyl and hydroxyl group-containing polyester or alkyd resin including an ε-caprolactone as a "reactive diluent", and an aminoplast resin as a cross-linking agent.

4 Claims, No Drawings

STOVING LACQUER SYSTEMS HAVING A HIGH SOLIDS CONTENT AND COMPRISING AN ε-CAPROLACTONE

This invention related to stoving lacquer systems having a high solids content based on hydroxyl and carboxyl group-containing polyesters and alkyd resins which contain ε-caprolactones as so-called reactive diluents and aminoplast resins as cross-linking agents.

Stoving lacquer systems having a high solids content are already known, for example lacquer systems containing melamine resins, polyesters which may be modified with fatty acids and carry hydroxyl and carboxyl groups, and low-molecular or monomolecular hydroxyl compounds containing at least two hydroxyl groups per molecule, have been described in German Offenlegungsschrift No. 2,253,300. These hydroxyl compounds act as "reactive diluents", that is to say they impart to the lacquer the necessary viscosity for application, and the stoving process incorporates them into the polymer as it is being formed during the crosslinking reaction. They may partly or completely replace the conventional volatile organic solvents. Suitable hydroxyl compounds are, for example, propane-1,2-diol, diethylene glycol and glycerol.

When polyols are used as so-called reactive diluents, there is a risk of an increase in the hydrophilic character of the hardened lacquer film due to an increase in the number of free hydroxyl groups in the binder, and this increased hydrophilic character may impair the quality of the lacquer coats. Although such a phenomenon can be compensated for by increasing the proportion of crosslinking agents, this can generally only be achieved at the expense of a reduction in the elasticity of the film.

It has now been found that high-quality lacquer binders in which the problem described above does not arise can be obtained by using ε-caprolactones, preferably unsubstitutued ε-caprolactone, as reactive diluents. Since the lactone group is not split up until the reaction of the "reactive diluent" with the hydroxyl or carboxyl functions of the polyester, respectively alkyd resin or the aminoplast resin, this is an elegant method of ensuring that the total number of free hydroxyl groups in the binder according to the invention is not increased during the stoving process.

On the basis of the known physical and chemical properties of ε-caprolactone, the compound could have been expected to evaporate to a considerable extent under the conditions of the stoving process. One would also have expected homopolymerisation of the lactone to take place, and the polylactones thereby formed would have resulted in unacceptable, cloudy lacquers when mixed with a large number of polyesters and alkyd resins.

Although γ- and δ-lactones such as γ-butyrolactone and δ-valerolactone undergo considerable evaporation under stoving conditions, it was surprisingly found that ε-caprolactones and particularly unsubstituted ε-caprolactone react in the presence of polyesters or alkyd resins before they can evaporate to any large extent. Since the exhaust gas from the stoving chamber is found to contain less than 1% of the caprolactone introduced into the process when the stoving lacquer systems according to the invention are used, it must be assumed that the ε-caprolactones are incorporated almost quantitatively in the lacquer film by condensation.

This invention relates to stoving lacquer systems having a high solids content which contain
 A. 65 to 85% by weight, based on the sum of components A and B, of binders and
 B. 35 to 15% by weight, based on the sum of components A and B, of an aminoplast resin
in addition to the usual pigments, fillers and other auxilliary agents and additives, characterised in that the binder consists of
 C. 75 to 95% by weight, based on component A, of polyesters having molecular weights of between 600 and 5.000 which contain hydroxyl and carboxyl groups and which may be modified with fatty acids (alkyd resins), and
 D. 25 to 5% by weight, based on component A, of ε-caprolactone of which up to 50 mol-% may be replaced by lower molecular or mono-molecular hydroxyl compounds which contain at least two hydroxyl groups per molecule and have molecular weights between about 66 and about 600.

The aminoplast resins B may be any melamine resins which are either unetherified or etherified with saturated monohydric alcohols containing 1 to 4 C-atoms, for example the melamine resins described by D.H. Solomon in The Chemistry of Organic Film-formers, 235–240, John Wiley & Sons, Inc., New York, 1967. These melamine resins B may also be partly or completely replaced by other cross-linking aminoplastics such as those which have been described in for example, "Methoden der Organischen Chemie", (Houben-Weyl), Volume 14/2, part 2,4th edition, Georg Thieme Verlag, Stuttgart 1963, 319 et seq., or by phenoplasts such as those described in e.g. ibid, 193 et seq.

Component C may be oil-free polyesters or preferably fatty acid-modified (in most cases short oil) polyesters (= alkyd resins).

By alkyd resins are meant fatty acid-modified polyesters obtained by polycondensation of alcohols and carboxylic acids by known methods, as defined in, for example, Römpp's Chemielexikon, Volume 1, page 202, Franckh'sche Verlagsbuchhandlung, Stuttgart 1966, or by D.H. Solomon in "The Chemistry of Organic Film-formers", pages 75–101, John Wiley & Sons, Inc., New York, 1967.

Examples of alcohols suitable for the production of the polyesters and alkyd resins C are mono- and polyhydric, especially di-, tri- and tetrahydric alcohols containing 2 – 24 carbon atoms, e.g. sorbitol, pentaerythritol, glycerol, trimethylolpropane, trimethylolethane, butane-1,2,4-triol, hexane-1,2,6-triol, ethylene glycol, propane-1,2-diol, propane-1,3-diol, butane-1,2-diol, butane-1,3-diol, butane-1,4-diol, neopentyl glycol, diethylene glycol, triethylene glycol, dipropylene glycol, hexanediols such as hexane-1,6-diol, polyhydrobisphenols, bis-oxethylated bisphenols, 1,2-bis-[hydroxymethyl]-cyclohexane, 1,4-[hydroxymethyl]-cyclohexane, 2,2-dimethyl-propane-1,3-diol, 2-ethylhexane-1,3-diol, cyclohexane-1,2-diol, cyclohexane-1,4-diol, bisethylene glycol adipate, neopentyl glycol hydroxypivalate, benzyl alcohol, cyclohexanol and other monohydric alcohols containing 1 to 6 carbon atoms. Trimethylolpropane, glycerol and pentaerythritol are preferred.

Examples of carboxylic acids suitable for the production of polyesters and alkyd resins C are aromatic, cycloaliphatic and saturated aliphatic mono-, di- and tricarboxylic acids, preferably containing 4 to 12 carbon atoms and their esterforming derivatives, e.g. phthalic acid, isophthalic acid, terephthalic acid, tetra- and hexahydro-phthalic acid, endomethylene tetrahydrophthalic acid, succinic acid, adipic acid, sebacic acid, trimellitic acid, benzoic acid, and its derivatives, e.g. p-tert.-butyl-benzoic acid and hexahydrobenzoic acid; α-ethylhexanoic acid. The tribasic acids are commonly used in inferior amounts only. Phthalic acid is the compound most commonly used.

The proportion of oil in the alkyd resins used for the lacquer binders according to the invention, calculated as triglyceride and based on the alkyd resin, may be 0 to 60% by weight, preferably 18 to 50% by weight and in particular 25 to 35% by weight, based on component C. The drying or non-drying fatty acids, which generally contain 6 to 24 C-atoms, may be used either as such or in the form of their glyceric esters (triglycerides). Vegetable and animal oils, fats and fatty acids are suitable, for example coconut oil, ground nut oil, castor oil, olive oil, soya-bean oil, linseed oil, cotton seed oil, safflower oil and the fatty acids of these oils, dehydrated ricinoleic acid, tall oil fatty acid, singly unsaturated conjugated and isomerised unsaturated fatty acids, lard, tallow and train oils.

The acid numbers of the polyesters and alkyd resins of component C should be between 5 and 40 and preferably between 15 and 30; the OH-numbers should be between 40 and 140, preferably between 60 and 100 and the molecular weights should be between 600 and 5000, preferably between 800 and 1500. The number average molecular weight is determined by vapour pressure osmosis in dioxane and acetone (If the values differ from each other, the lower value is considered to be the more accurate one).

In the context of the present application, by ε-caprolactones D are meant the alkyl-substituted ε-caprolactones which contain 1 to 6 and preferably 1 to 3 carbon atoms in the alkyl group, but in particular unsubstituted ε-caprolactone itself.

Suitable low-molecular or mono-molecular hydroxyl compounds D are di-, tri- and tetrahydric alcohols containing 2 to 24 carbon atoms, for example, ethylene glycol, propane-1,2-diol, butanediols, bis-glycol adipate, diethylene glycol and glycerol, but it is preferred to use polyols which are solid at room temperature, e.g. neopentyl glycol, trimethylolpropane, hexane-1,6-diol or hydroxypivalic acid neopentyl glycol ester.

In addition, up to 20% by weight, based on component A, of the usual organic solvents used in lacquer technology such as petroleum hydrocarbons, aromatic solvents, esters, ketones and alcohols may be added to the lacquer systems according to the invention.

Pigments such as titanium dioxide, carbon black, talcum, barium sulphate, zinc sulphate, strontium chromate, barium chromate, molybdenum red, iron yellow, iron red, iron black or hydrated iron oxides, or also pigments such as cadmium yellow or cadmium red, or organic pigments and dyes may be added in quantities of 0 to 100% by weight, based on component A, to pigment the lacquers by the usual methods employed in the art.

Auxiliary agents and additives such as catalysts, inhibitors, levelling agents, matting agents, antisettling agents, defoaming agents, plasticisers and others commonly used in lacquer technology may also be added to the lacquers according to the invention.

The stoving lacquers according to the invention, which allow for a considerable saving in solvents and consumption of energy, are generally applied by the usual methods such as casting, spraying, dipping, brush-coating etc., usually in thicknesses of 40 to 180 μ. Hardening is carried out by stoving at temperatures between 80° and 280° C, preferably between 100° and 140° C.

The present invention makes lacquers available which not only have the advantages alreadey listed by also very good film-forming properties at low hardening temperatures, excellent elasticity, hardness and stability and optimum levelling and flow properties. Another advantage is obtained when the combination according to the invention is applied to binder systems for so-called high solid lacqers which are based on polyesters or alkyd resins having molecular weights in the region of the lower limit of 600 to 1500. These combinations can be worked up without the addition of a volatile solvent.

The parts given in the following examples are parts by weight and percentages are percentages by weight.

EXAMPLE 1

An alkyd resin having an acid number of about 2 is prepared from 11328 parts of glycerol, 16384 parts of phthalic acid anhydride, 1796 parts of adipic acid, 13678 parts of soya oil fatty acid, 3050 parts of ethylene glycol and 6002 parts of benzioc acid by esterification at 220° C in a nitrogen atmosphere. This alkyd resin is then reacted with 3292 parts of phthalic acid anhydride to obtain a soya alkyd resin having an oil content of about 28%, an acid number of about 25 and a viscosity which corresponds to an outflow time of about 90 seconds determined on a 60% solution in xylene (DIN 53211).

A mixture containing about 10% of volatile solvent is prepared from 90 parts of the alkyd resin, 18 parts of ε-caprolactone and 10 parts of ethyl glycol acetate. A clear lacquer having a viscosity of about 6700 cP at 20° is obtained by adding to this mixture 18 parts of a liquid, 98–100% methylol melamine resin which has been methyl etherified. This lacquer can be hardened to form a clear, non-yellowing, nail-hard, elastic, glossy film within 30 minutes at 125° C by the addition of catalytic quantities of p-toluene sulphonic acid.

EXAMPLE 2

A mixture which contains 9–10% of volatile solvent is prepared from 90 parts of the alkyd resin described in example 1, 12.4 parts of ε-caprolactone, 5.6 parts of neopentyl glycol and 10 parts of ethyl glycol acetate. A clear lacquer having a viscosity of about 8200 cP at 20° C is obtained by the addition of 18 parts of a 98–100% liquid, methyl etherified methylol melamine resin to this mixture. This lacquer can be hardened to form a clear, non-yellowing, nail-hard, elastic, glossy film within 30 minutes at 125° C by the addition of catalytic quantities of p-toluene sulphonic acid.

We claim:
1. A stoving lacquer which comprises
A. 65 to 85% by weight of a binder, based on the combined weight of (A) and (B) and
B. 35 to 15% by weight of an aminoplast resin, based on the combined weight of (A) and (B), said binder consisting of i. 75 to 95% by weight of a polyester having a molecular weight between 600 and 5,000 and containing hydroxyl and carboxyl groups and
ii. 25 to 5% by weight of an ε-caprolactone or of an ε-caprolactone in admixture with up to 50 mol % by weight of a polyhydroxyl compound having a molecular weight between about 66 and about 600.

2. The stoving lacquer of claim 1 containing up to 20% by weight, based on the weight of (A), of an organic lacquer solvent.

3. The stoving lacquer of claim 1 wherein (i) is modified with a fatty acid.

4. The stoving lacquer of claim 3 wherein (i) is a ricinic or soya alkyd resin having an oil content of between 25 and 35% by weight, based on the weight of (i), an acid number of between 15 and 30 and an OH number of between 60 and 100.

* * * * *